Aug. 1, 1961 H. W. WELSH 2,994,506
ROTOR BLADE LOCKS
Filed July 21, 1958 2 Sheets-Sheet 1

INVENTOR.
Harvey W. Welsh
BY Paul Fitzpatrick
ATTORNEY

Aug. 1, 1961  H. W. WELSH  2,994,506
ROTOR BLADE LOCKS

Filed July 21, 1958  2 Sheets-Sheet 2

INVENTOR.
Harvey W. Welsh
BY Paul Fitzpatrick
ATTORNEY

United States Patent Office 2,994,506
Patented Aug. 1, 1961

2,994,506
ROTOR BLADE LOCKS
Harvey W. Welsh, Indianapolis, Ind., assignor to General Motors Corporation, Detroit, Mich., a corporation of Delaware
Filed July 21, 1958, Ser. No. 750,022
8 Claims. (Cl. 253—77)

My invention relates to blade locks for rotary machines, such, for example, as compressors and turbines. It is customary in such machines to mount a row of blades on the periphery of a disk or other rotor structure by sliding the roots of the blades into dovetail grooves extending more or less axially across a rim or flange on the rotor. Some arrangement must be provided to hold or lock the blades in place in the slots, and many arrangements for this purpose have been proposed.

My invention is directed to blade locks which are particularly advantageous from the standpoints of positive retention of the blade, ease of application and removal of the lock, light weight, and simplicity of structure leading to manufacturing economies.

The principal objects of the invention are to improve the retention of blades on turbomachine rotors and to provide improved blade locks for such machines.

The nature of the invention and the advantages thereof will be clear to those skilled in the art from the succeeding detailed description and drawings of preferred embodiments of the invention.

Figure 1:
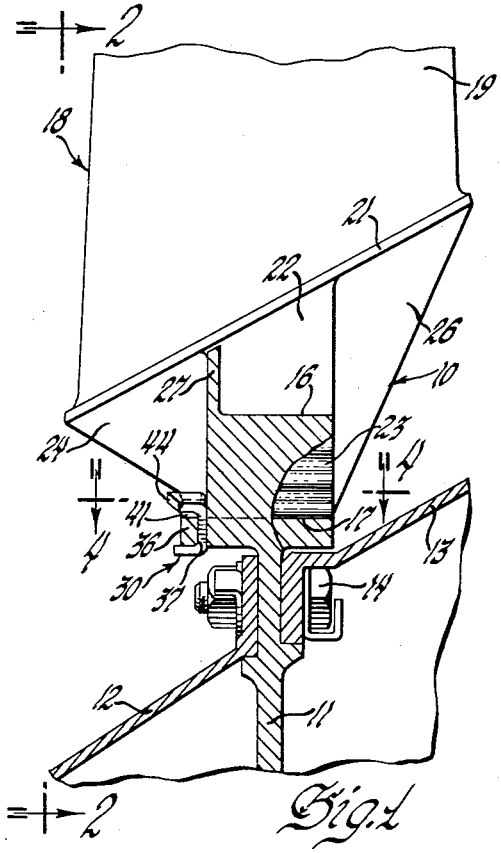
FIGURE 1 is a fragmentary sectional view of an axial flow compressor rotor taken on a plane containing the axis of the rotor, illustrating a first embodiment of the invention.
Figure 2:
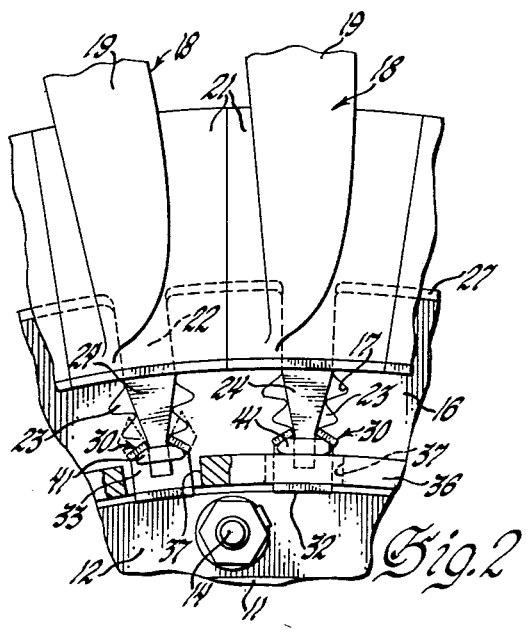
FIGURE 2 is a fragmentary front elevation view of the same taken on the plane indicated by the line 2—2 in FIGURE 1.

Referring first to FIGURES 1 and 2 for a description of an illustrative embodiment of the invention, a compressor rotor 10 comprises one or more disks 11, only one of which is shown. The disks may be connected by spacer rings such as 12 and 13 fixed to the disk 11 adjacent the rim thereof by bolts and nuts 14. The disk 11 has a relatively heavy rim or flange 16 in which are cut dovetail slots 17 extending across the rim of the wheel. These slots may be parallel to the axis or may be inclined or skewed with respect to the axis.

A number of rotor blades 18 are mounted on the rim 16 of disk 11. Each blade comprises an airfoil or blade portion 19, a blade platform 21, a stalk 22, and a root 23, the root having serrations for mounting in the multiple dovetail slot 17. The stalk connects the root to the platform and the airfoil extends outwardly from the platform. The platforms of adjacent blades abut to provide the inner boundary of the flow path through the rotor stage. Webs 24 and 26 extend from the forward and rear faces of the root and stalk to the blade platform. An interrupted air baffle flange 27 extends from the rim to close the spaces between the stalks 22. It will be understood that the rotor structure so far described is merely illustrative of one type of rotor structure to which the invention may be applied.

Figure 3:
FIGURE 3 is an axonometric view of the blade retaining member of FIGURES 1 and 2.

The invention is particularly concerned with the blade locking means which, in the embodiment of FIGURES 1 to 4 comprises a blade locking or retaining member 30 best shown in FIGURE 3 as it appears before it is fixed in place. The member 30 comprises a body 31 including a flange 32 projecting at right angles from the body and two prongs 33 extending generally parallel to each other from the body, the outer end portions 44 of the prongs diverging to some extent for a reason which will become apparent. The retaining member is a simple sheet metal stamping.

The rim 16 of the rotor includes a forwardly projecting flange 36 which has a slot 37 cut through it immediately below each blade slot 17. The blade root includes a projection 41 extending forwardly of the rim 16 and overlying the flange 36. The projection 41 may be simply a continuation of the contour of the innermost blade root serration 42. An opening in the form of a notch 43 is provided in each side of the blade root portion 41. The opening 43 and the slot 37 are very slightly wider than the thickness of the sheet metal of retaining member 30.

Figure 4:
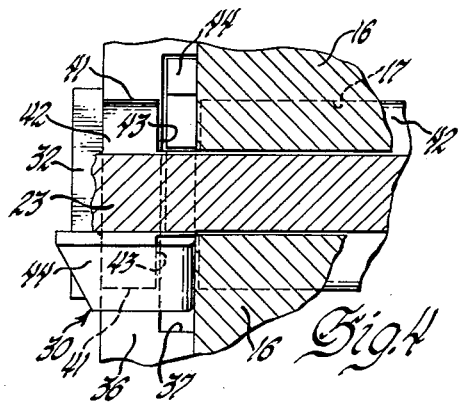
FIGURE 4 is a fragmentary enlarged sectional view of the structure of FIGURES 1 and 2 taken on the plane indicated by the line 4—4 in FIGURE 1.
Figure 5:
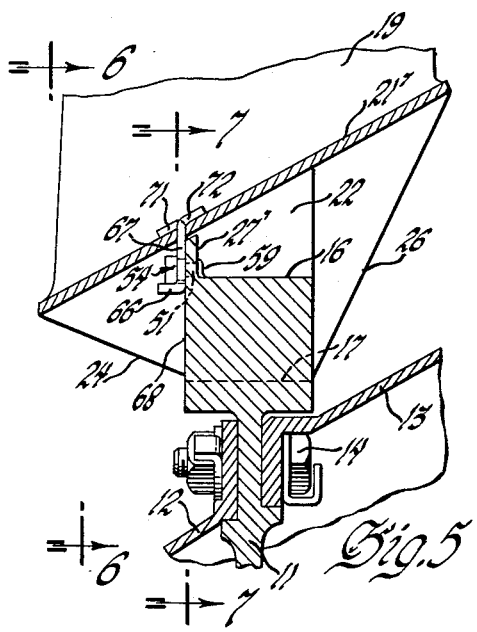
FIGURE 5 is a view similar to FIGURE 1 illustrating a second embodiment of the invention.

When the blade is correctly located in the rim of the rotor, the openings 43 register with the slot 37. The retaining member 30 may then be slid outward through the slot 37 and openings 43 until the flange 32 abuts the inner surface of flange 36. The diverging outer end portions 44 of the prongs 33 constitute bendable tabs which extend beyond the projection 41 of the blade root. These are then bent forwardly until they lie against the outer surface of the projection 41. FIGURE 4 shows an intermediate step in the installation of the retainer with one prong bent down and the other still in its original state. The angulation of the tabs 44 is provided because of the slope of the outer surface of the projection 41. Since the prong is bent on a line which is at an angle to the plane of flange 32, this angulation causes the tab 44 to lie alongside the blade root web 24 when the tab is bent down into place.

It will be seen that the retaining member is positively retained by the flange 32 and tabs 44 and since it passes through the slot 37 and openings 43 with small clearance, the blade cannot shift appreciably in the slot.

The blade may be very easily removed by bending up the tabs 44 and pulling the retainer out of the blade and rotor.

The second form of the invention, illustrated in FIGURES 5 to 9, is similar in its principle of operation and mode of installation to that previously described. It differs principally in a different structure for coupling the retaining member to the rotor and in the fact that the retaining member cooperates with the platform portion of the blade rather than the inner part of the blade root. Apart from the structure directly concerned with locking the blade, the blade and rotor structure illustrated in FIGURES 5 to 9 is the same as that previously described with reference to FIGURES 1 to 4 and need not be described again. Corresponding reference numbers indicate corresponding parts. The blade platform is identified as 21' since it is modified, and the air baffle flange as 27' because of its altered configuration. The air baffle flange 27' has a circular hole 51 through it immediately radially inwardly from the joining line 52 of adjacent blade platforms 21'. A stepped pin or rivet 54, shown most clearly in FIGURE 8, comprises a rectangular head 56, a spacer portion 57 or body projecting from one side of the head 56, and a pin or rivet portion 58 of smaller diameter than portion 57 dimensioned to fit the hole 51. The portion 58 extends through the hole 51 and is headed or riveted as indicated at 59 in FIGURE 5 to fix the member 54 to the rotor.

Each blade platform 21' has two small openings 61 near the edges of the blade platform and in the same plane axially of the rotor as the body 57 of the pin 54. These openings 61 are provided to receive the blade retaining member 64, shown most clearly in FIGURES 7 and 9. This member comprises a body 66 and two prongs 67 extending parallel to each other from the body. The plane of the prongs is at a right angle to the plane of the body so that the body 66 provides the part corresponding to the flange 32 of FIGURE 3. The retaining member 64 is a simple formed part of sheet metal.

When the blades are in place on the rotor, the retaining member 64 may be slid outwardly with the prongs 64 entering the space between the head 56 of pin 54 and the forward face 68 of the air baffle flange and extending through the openings 61 until the body or flange 66 lodges against the radially inner surface of head 56. The outer ends of the prongs 67 are bent over to provide retaining tabs 71 and 72, the former being bent forwardly and the latter rearwardly. These bent-over tabs hold the retaining member against inward movement. The engagement of the prongs 67 between the head 56 and the face of the rotor and within the openings 61 locks the blades against movement in the slot.

Figure 6:
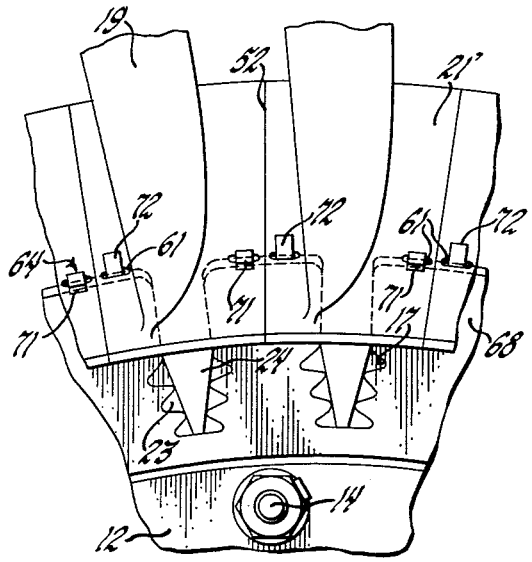
FIGURE 6 is a fragmentary front elevation view of the same taken on the plane indicated by the line 6—6 in FIGURE 5.
Figure 7:
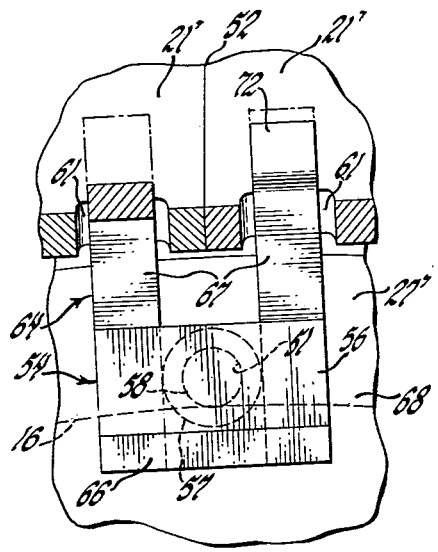
FIGURE 7 is an enlarged detail sectional view taken on the plane indicated by the line 7—7 in FIGURE 5.
Figure 8:
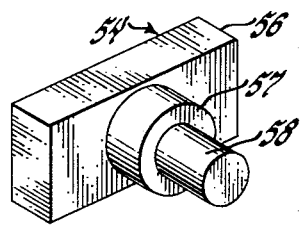
FIGURE 8 is an axonometric view of a headed pin employed in the structure of FIGURE 5.
Figure 9:
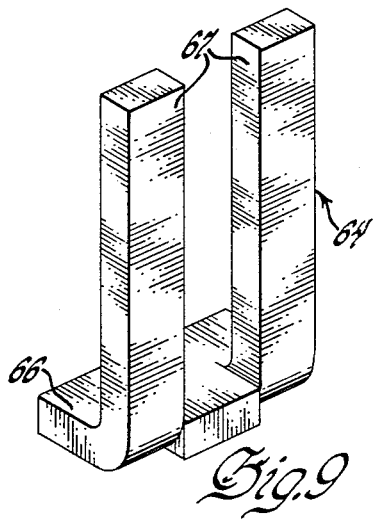
FIGURE 9 is an axonometric view of the blade retaining member of FIGURE 5.

It will be apparent that each alternate one of the retaining members illustrated in FIGURE 6 could be omitted and one lock would be provided for each blade. However, the structure of FIGURE 6 provides the additional safety feature of two locks on each blade. The retainer 64 may readily be removed by bending up the tabs 71 and 72 and pushing the retainer radially inward.

It will also be apparent that the retaining member 64 could be mounted on the rotor by a slotted flange such as flange 36 of FIGURES 1 and 2, disposed near the periphery of the rim in the same radial location as heads 56 of pins 54.

It will be clear to those skilled in the art that both forms of the invention provide light weight blade locks which are very easy to apply and remove and quite secure.

The detailed description of preferred embodiments of the invention for the purpose of explaining the principles thereof is not to be construed as limiting or restricting the invention, since many modifications may be made by the exercise of skill in the art within the scope of the invention.

I claim:

1. A rotor assembly for a turbomachine comprising, in combination, a rotor having blade receiving slots in the periphery thereof extending generally axially of the rotor, detachable blades including roots slidably mounted in the slots; forked blade retaining members locking the blades in the slots, each said member comprising a body and two mutually spaced prongs extending generally parallel to each other from the body, the prongs extending generally radially of the rotor; means on the rotor engaging the body and restraining the member against radially outward movement, the said means also engaging the prongs and restraining the member against movement axially of the rotor; the blades having openings receiving the prongs bounded by radial faces engaging the prongs to restrain the blade against movement axially of the rotor in the slot; the ends of the prongs being bent over against the blades to hold the members against radially inward movement; the rotor assembly including means restraining the blades against movement radially of the rotor.

2. A rotor assembly as recited in claim 1 in which the blade root includes a projection extending from the rotor and the ends of the prongs are bent over against the said projection.

3. A rotor assembly as recited in claim 1 in which the blades include platforms, the openings are provided in the platforms, and the ends of the prongs are bent over against the platforms.

4. A rotor assembly as recited in claim 1 in which the said means on the rotor is a flange extending from the rotor having slots therein through which the prongs extend.

5. A rotor assembly as recited in claim 1 in which the said means on the rotor includes a headed pin fixed to the rotor adjacent each blade.

6. A rotor assembly for a turbomachine comprising, in combination, a rotor having a blade receiving slot in the periphery thereof extending generally axially of the rotor, a detachable blade including a root slidably mounted in the slot; a forked blade retaining member comprising a body and two mutually spaced prongs extending generally parallel to each other from the body, the prongs extending generally radially of the rotor; means on the rotor engaging the body and restraining the member against radially outward movement, the said means also engaging the prongs and restraining the member against movement axially of the rotor; the blade having openings receiving the prongs bounded by radial faces engaging the prongs to restrain the blade against movement axially of the rotor in the slot; the ends of the prongs being bent over against the blade to hold the member against radially inward movement; the rotor assembly including means restraining the blade against movement radially of the rotor.

7. A rotor assembly for a turbomachine comprising, in combination, a rotor having a blade receiving slot in the periphery thereof extending generally axially of the rotor, a detachable blade including a root slidably mounted in the slot; a forked sheet metal blade retaining member comprising a flanged body and two mutually spaced prongs extending generally parallel to each other from the body, the prongs extending generally radially of the rotor; means on the rotor engaging the flange of the body and restraining the member against radially outward movement, the said means also engaging the prongs and restraining the member against movement axially of the rotor; the blade root having openings receiving the prongs bounded by radial faces engaging the prongs to restrain the blade against movement axially of the rotor in the slot; the ends of the prongs being bent over against the blade root to hold the member against radially inward movement; the rotor assembly including means restraining the blade against movement radially of the rotor.

8. A rotor assembly for a turbomachine comprising, in combination, a rotor having blade receiving slots in the periphery thereof extending generally axially of the rotor, detachable blades including roots slidably mounted in the slots; forked blade retaining members each comprising a body and two mutually spaced prongs extending generally parallel to each other from the body, the prongs extending generally radially of the rotor; a headed pin fixed on the rotor adjacent each slot extending between the prongs and engaging the body and thereby restraining the member against radially outward movement, the said pin also engaging the prongs and restraining the member against movement axially of the rotor; the blades having platforms defining openings receiving the prongs bounded by radial faces engaging the prongs to restrain the blade against movement axially of the rotor in the slot; the ends of the prongs being bent over against the blade platforms to hold the members against radially inward movement; the rotor assembly including means restraining the blade against movement radially of the rotor.

References Cited in the file of this patent

UNITED STATES PATENTS

| | | |
|---|---|---|
| 2,755,063 | Wilkinson | July 17, 1956 |
| 2,781,962 | Wilder | Feb. 19, 1957 |

FOREIGN PATENTS

| | | |
|---|---|---|
| 541,490 | Italy | Apr. 3, 1956 |